UNITED STATES PATENT OFFICE.

TIMOTHY J. MURTHA, OF NEW YORK, N. Y.

COMPOUND FOR TREATING GLASS SURFACES.

1,095,663.        Specification of Letters Patent.        Patented May 5, 1914.

No Drawing.        Application filed June 28, 1913.   Serial No. 776,421.

*To all whom it may concern:*

Be it known that I, TIMOTHY J. MURTHA, a citizen of the United States, and a resident of the city of New York, in the county of New York and State of New York, have invented certain new and useful Improvements in Compounds for Treating Glass Surfaces, of which the following is a specification.

The present invention relates to a compound for treating glass surfaces in order to prevent the condensation of moisture or vapors upon the same, and thus in cold weather the formation of frost thereon. The compound is especially useful when applied to glass panes of show-windows, where the condensation of vapor and the formation of frost is objectionable, although it will be easily seen that the compound can be applied to any other glass surface where the condensation of vapor is found objectionable. It may be applied, for instance, to lenses of eye-glasses in order to keep the same clean in cold weather when the said lenses are usually being covered with vapors or moisture as soon as a person enters a room from outside. It is also found serviceable when applied to windows of railroad engine cabs where the condensation of moisture in conjunction with the smoke that settles onto the window panes is always objectionable, and some times a serious matter.

The compound consists of the following ingredients combined in the proportions stated, which is:

| | | |
|---|---|---|
| Water | 1 | quart |
| Soap chips, preferably white | 8 | ounces |
| Elm bark | 5½ | " |
| Quillai bark | 1½ | " |
| Glycerin | 2½ | " |
| Potassium carbonate | 1½ | " |
| Ammonia water | 1½ | " |
| Common salt | 2 | " |
| Alcohol (80% proof) | 1½ | " |

These ingredients are mixed, put upon fire and slowly boiled for about ten minutes, and then exposed to higher temperature for about thirty minutes, and thoroughly stirred and agitated while being boiled. An enameled pot and an enameled ladle should be used in preparing the compound. The mixture is then removed from the fire and left to cool for about twenty-four hours, whereby a hard soapy substance is obtained which is ready for use.

The above proportions are the preferred ones, it being obvious that some variations in the proportions can be permitted without destroying the value of the compound for the uses above mentioned.

The glass surface to be treated should be first cleaned and dried, and the composition then rubbed slightly over this surface. After this the glass is rubbed gently with cheese cloth, or a similar soft material, until it is polished and transparent. Care is to be taken so as not to remove by rubbing the compound from the glass. The condensation of vapor or moisture upon the surface so treated is effectively guarded against, and the formation of frost is prevented. Obviously the treatment of the glass surface has to be repeated from time to time. Attention is called to the fact that the compound prevents window panes from being smoked, a function that is particularly desirable when the compound is applied to windows of railroad engine cabs.

What I claim is:

1. A compound for treating glass surfaces consisting of water, soap, elm bark, quillai bark, glycerin, potassium carbonate, ammonia water, common salt, and alcohol, in substantially the proportions described.

2. A compound for treating glass surfaces consisting of water one quart, soap eight ounces, elm bark five and one-half ounces, quillai bark one and one-half ounces, glycerin two and one-half ounces, potassium carbonate one and one-half ounces, ammonia water one and one-half ounces, common salt two ounces, and alcohol one and one-half ounces, substantially as described.

TIMOTHY J. MURTHA.

Witnesses:
  THOS. F. SCULLY,
  LILLIAN MARTIN.